United States Patent [19]
Golden

[11] Patent Number: 5,188,411
[45] Date of Patent: Feb. 23, 1993

[54] VACUUM CUP CONTROL APPARATUS

[75] Inventor: Michael J. Golden, Sterling Heights, Mich.

[73] Assignee: John A. Blatt, Grosse Pointe Shores, Mich.

[21] Appl. No.: 645,135

[22] Filed: Jan. 24, 1991

[51] Int. Cl.$^5$ .......................... B25J 15/06; F04F 5/48
[52] U.S. Cl. ................................. 294/64.2; 137/487.5; 417/187; 294/907
[58] Field of Search .................. 294/64.1, 64.2, 65, 294/907; 137/487.5, 502, 557, 560; 271/96, 98, 108; 307/118; 414/627, 737, 752; 417/182, 185, 186–193

[56] References Cited

U.S. PATENT DOCUMENTS

| | | | |
|---|---|---|---|
| 2,934,086 | 4/1960 | Blatt | 137/560 |
| 3,349,927 | 10/1967 | Blatt | 294/64.2 X |
| 3,568,959 | 3/1971 | Blatt | 294/64.2 |
| 3,613,904 | 10/1971 | Blatt | 294/64.2 X |
| 4,089,622 | 5/1978 | Aubel et al. | 417/189 X |
| 4,417,312 | 11/1983 | Cronin et al. | 137/487.5 X |
| 4,453,755 | 6/1984 | Blatt et al. | 294/64.2 |
| 4,655,692 | 4/1987 | Ise | 294/64.2 X |
| 4,679,583 | 7/1987 | Lucas et al. | 137/487.5 X |
| 4,750,768 | 6/1988 | Kumar | 294/64.1 |
| 4,777,383 | 10/1988 | Waller et al. | 307/118 |
| 4,828,306 | 5/1989 | Blatt | 294/64.2 |
| 4,865,521 | 9/1989 | Ise et al. | 417/187 |
| 4,950,016 | 8/1990 | Kumar | 294/64.2 |
| 4,957,318 | 9/1990 | Blatt | 294/64.1 |

FOREIGN PATENT DOCUMENTS 2559851 8/1985 France ........................... 417/189

Primary Examiner—Johnny D. Cherry
Attorney, Agent, or Firm—Basile and Hanlon

[57] ABSTRACT

A vacuum cup control apparatus for applying and releasing vacuum in a vacuum cup engaging a workpiece includes a housing having a venturi passage for inducing a vacuum within the vacuum cup upon the flow of air through the venturi passage. A one-way check valve in the passage seals the vacuum in the vacuum cup upon cessation of air flow through the venturi passage. Another air flow passage extends through the housing to a control port on the housing for injecting a flow of air under pressure to the vacuum cup to relieve the vacuum therein. A sensor mounted in the housing senses the vacuum level attained in the vacuum cup. A feedback signal is sent by the control apparatus to the external controller as an indication that a predetermined vacuum level has been achieved. The control apparatus is responsive to the sensor and signals from an external controller for applying vacuum to the vacuum cup until a predetermined vacuum level is attained in the vacuum cup. The control apparatus also injects air under pressure to the vacuum cup to relieve the vacuum in response to a signal from the external controller. After the initial application of vacuum and prior to the injection of air under pressure to the vacuum cup, if the vacuum level within the vacuum cup decreases below the predetermined set level, the control apparatus will reapply vacuum until the predetermined vacuum level is reached.

8 Claims, 3 Drawing Sheets

VACUUM CUP CONTROL APPARATUS

BACKGROUND OF THE INVENTION

1. Field of the Invention

The present invention relates, in general, to vacuum cups and, more specifically, to control apparatus for applying and releasing a vacuum from a vacuum cup.

2. State of the Art

Vacuum cups are commonly employed as workpiece gripping elements to engage and transport a workpiece in a manufacturing operation, to load and unload sheet metal parts into and from a die, or to carry a part, such as an automobile windshield, to the vehicle to which it is to be installed.

Such vacuum cups employ a control apparatus which uses a venturi passage in a body which is connected to a source of air under pressure. Air flow through the venturi passage induces a subatmospheric pressure in the throat of the venturi and in a passage connecting the venturi throat to the interior of the vacuum cup which will induce a vacuum within the cup when the cup engages a workpiece surface. In earlier versions of such vacuum cup control apparatus, it was necessary to constantly maintain the flow of air through the venturi passage in order to maintain the vacuum in the cup because the air withdrawn from the cup flowed into the venturi passage and to the discharge vent at the end of this passage. Upon cessation of the air flow, air at atmospheric pressure was free to flow in a reverse direction through the discharge vent, the venturi passage and into the vacuum cup to dissipate the vacuum therein.

Efforts to address this problem led to the use of one-way check valves between the venturi and the vacuum cup to seal the vacuum in the vacuum cup upon cessation of air flow through the venturi. This enabled the vacuum cup to securely maintain a grip on a workpiece after air flow through the venturi was stopped.

Another problem with previously devised vacuum cups deals with the quick release of the vacuum from the cup to release the workpiece at the conclusion of the handling operation. The passage from the discharge vent to the vacuum cup is a relatively restricted passage and the rate of air flow through this passage would diminish substantially as the pressure differential between the negative pressure within the cup and atmospheric pressure approached equalization. Further, even when the vacuum was turned "off", the suction remaining between the vacuum cup and the workpiece could be sufficient to cause the vacuum cup to remain attached to the workpiece and thereby prevent or make uncertain the release of the workpiece from the vacuum cup.

Efforts to overcome this problem led to the use of "blow-off" passages which inject air under pressure into the vacuum cup to rapidly release the vacuum between the vacuum cup and the workpiece. Despite these advances in the use of vacuum cups as work gripping elements, problems are still encountered. Leaks can occur in the vacuum cup or between the vacuum cup and the workpiece which cause a decrease in the vacuum in the vacuum cup and could lead to inadvertent separation of the workpiece from the vacuum cup. Such leaks could result from worn or cracked vacuum cups, deformed workpieces, etc. No apparatus has been devised for vacuum cups which detects leaks or a decrease in vacuum levels within a vacuum cup so as to enable vacuum to be reapplied to the vacuum cup to a preset level.

U.S. Pat. No. 4,750,768 discloses a gripper device using a plurality of vacuum cups in which a sensor associated with each vacuum cup senses contact between the associated vacuum cup and an object. An output signal from the sensor then causes vacuum to be applied to the vacuum cup. Only those vacuum cups where contact with a workpiece or object is detected by the associated sensor have vacuum applied thereto. However, this control apparatus still does not detect a decrease in vacuum level within the vacuum cup after vacuum has been initially applied to the vacuum cup or reapply vacuum to the vacuum cup after the initial application of vacuum to maintain the vacuum at a preset level.

Thus, it would be desirable to provide a control apparatus for vacuum cups which overcomes the problems associated with previously devised vacuum control apparatus. It would also be desirable to provide a control apparatus for vacuum cups which detects the vacuum level in the vacuum cup so as to cease the application of vacuum when the vacuum level reaches a preset level and which reapplies vacuum to the vacuum cup when a decrease in vacuum below a predetermined amount is detected.

SUMMARY OF THE INVENTION

The present invention is a vacuum cup control apparatus for applying and releasing vacuum to a vacuum cup engaging a workpiece and for automatically reapplying vacuum to the vacuum cup in the event of a decrease in vacuum in the vacuum cup while the vacuum cup is engaged with a workpiece.

The vacuum cup control apparatus includes a housing having a first flow passage extending therethrough between a first inlet end connectable to a source of pressurized air and an outlet vented to atmosphere. A venturi means including a throat section is formed in the housing and disposed in fluid flow communication with the first passage for providing a subatmospheric pressure in the throat section upon the flow of air through the first passage. A second flow passage is formed in the housing and extends from the first flow passage to a control outlet port on the housing. A one-way valve means is disposed in the second passage means for allowing flow in one direction from the control port through the second passage to the first passage. A third passage means is also formed in the housing and is connected to the source of pressurized air and to the control port for supplying air under pressure to the vacuum cup to release the vacuum in the vacuum cup.

Sensor means are mounted in the housing for sensing the vacuum at the control port. Input/output connector means are also mounted in the housing for receiving an electrical signal from an external controller to separately apply and release vacuum to the vacuum cup.

A control means is responsive to the sensor means and the connector means for controlling the application of vacuum to the vacuum cup, the application of pressurized air to the vacuum cup and the reapplication of vacuum to the vacuum cup in the event of a decrease in vacuum below a predetermined level after vacuum has been initially applied to the vacuum cup and prior to the application of pressurized air to the vacuum cup. In a preferred embodiment, the control means includes valve means for controlling the flow of air to the first and third passages in the housing. The valve means preferably comprises first and second separably operable valves, each respectively connected to the first and third passages and to a source of pressurized air.

The control means also includes a first comparator means responsive to the output of the sensor means and a reference signal for specifying a predetermined maximum vacuum in the vacuum cup. The first comparator means generates an output signal when the vacuum sensed by the sensor means reaches the predetermined vacuum level established by the reference signal. A first driver means is connected to the first comparator means for energizing the valve means to apply vacuum to the vacuum cup. First logic means is responsive to the first comparator means and the connector means for activating the driver means to apply vacuum to the vacuum cup and to deactivate the driver means when a predetermined vacuum level is reached in the vacuum cup.

The control means further includes a second comparator means, responsive to a second reference signal, and the output of the sensor means, for generating an output signal when the sensor output exceeds the level specified by the second reference signal. A second driver mean is responsive to the output signal from the second comparator means for energizing the valve means to apply air under pressure to the vacuum cup. A second logic means is responsive to the second comparator means and the connector means for activating the second driver means to apply air under pressure to the vacuum cup to release vacuum therefrom.

Finally, the control means also includes a third comparator means, responsive to a third reference signal and the output of the sensor means, for generating an electrical signal indicative of a predetermined vacuum level in the vacuum cup. A third driver means is connected to the third comparator means and to the input/output connector mean for supplying the output signal from the third comparator means to an external controller.

The vacuum cup control apparatus of the present invention overcomes many of the deficiencies found in previously devised vacuum cup control apparatus. The vacuum cup control apparatus of the present invention uniquely senses the vacuum level in a vacuum cup and automatically reapplies vacuum to the vacuum cup if any decrease in the vacuum level occurs. This insures that a proper vacuum level is maintained in the vacuum cup to maintain secure engagement with a workpiece.

The vacuum cup control apparatus of the present invention also provides for selective blow-off or the application of pressurized air to the vacuum cup to relieve the vacuum in the vacuum cup and to positively separate a workpiece from engagement with the vacuum cup. After an initial blow-off, if vacuum is generated between the vacuum cup and the workpiece for any reason, the control apparatus automatically reapplies pressurized air to the vacuum cup to insure a complete disengagement of the workpiece from the vacuum cup.

The vacuum cup control apparatus of the present invention is constructed in a small and economical manner so as to be easily attached to an individual vacuum cup. Alternately, the control apparatus can be constructed as a centralized unit with separate vacuum and air flow lines extending from a centralized unit or housing to each individual vacuum cup.

BRIEF DESCRIPTION OF THE DRAWING

The various features, advantages and other uses of the present invention will become more apparent by referring to the following detailed description and drawing in which.

DESCRIPTION OF THE PREFERRED EMBODIMENTS

Figure 1:
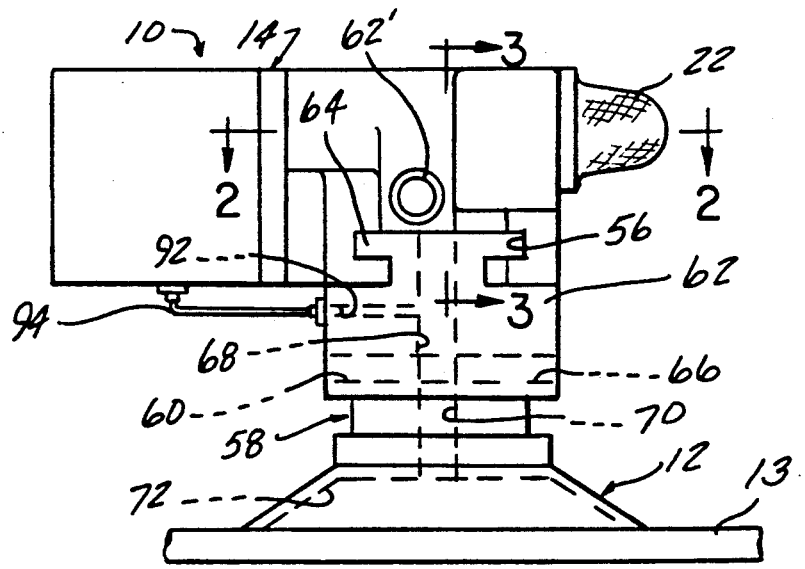
FIG. 1 is a side elevational view of a vacuum cup control apparatus constructed in accordance with the teachings of the present invention.
Figure 2:
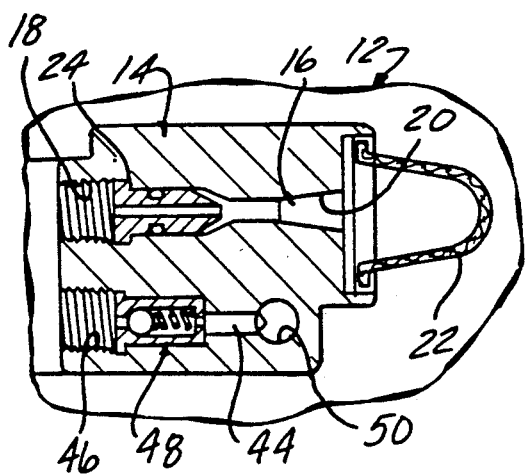
FIG. 2 is a cross sectional view generally taken along line 2—2 in FIG. 1.
Figure 3:
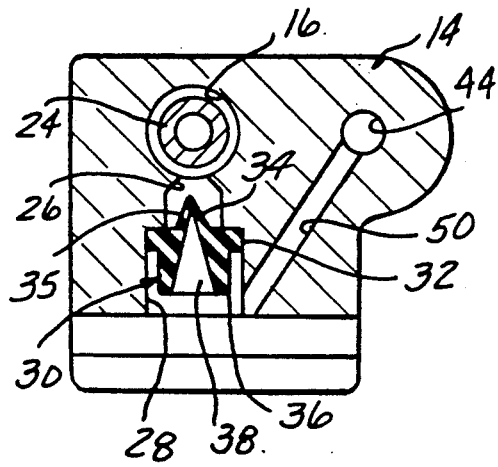
FIG. 3 is a cross sectional view generally taken along line 3—3 in FIG. 1.

Referring now to the drawing, and to FIGS. 1, 2 and 3 in particular, there is illustrated a vacuum cup control apparatus 10 which applies and releases vacuum from a vacuum cup 12 engaging a workpiece 13.

A vacuum cup 12 having any conventional form is connected to a housing shown generally by reference number 14. The housing 14 may be a single piece member or separate elements connected together by suitable fasteners.

A first flow passage means, such as a venturi passage 16, is formed in the housing 14. The venturi passage 16 extends from an inlet 18 at one end of the housing 14 to a discharge opening 20 at the opposite end of the housing 14. A conventional silencer 22 may be mounted at the discharge end 20 of the venturi passage 16.

The venturi passage 16 is of a conventional, well-known configuration and includes a nozzle 24 mounted therein. As is well known, a flow of air through the venturi passage 16 from the inlet 18 to the outlet 20 will induce a subatmospheric pressure in the region of the throat or small diameter section of the venturi passage 16. This region of reduced pressure is employed to induce a vacuum within the interior of the vacuum cup 12 through a second passage means or flow path 26. The second passage 26 extends from the region of reduced pressure in the venturi passage 16 to a control port 2 which is disposed in fluid flow communication with the vacuum cup 12, as described hereafter.

A one-way check valve 30 is mounted within the second passage 26 and is oriented to permit a flow of air from the control port 28 to the venturi passage 16 when the pressure at the control port 28 exceeds the pressure in the venturi passage 16. When air is flowing through the venturi passage 16, a subatmospheric pressure will be induced in the upper end of the second passage 26 and air will flow from the interior of the vacuum cup 12 into the control port 28, through the valve 30 and into the venturi passage 16 until the pressure within the interior of the vacuum cup 12 is equalized with that existing in the subatmospheric pressure region of the venturi passage 16.

As is well known and described in greater detail in U.S. Pat. No. 4,828,306, the contents of which are incorporated herein by reference, the check valve 30 is of a one-piece molded construction of rubber or other resilient synthetic material formed into a configuration shown in FIG. 3. The exterior of the check valve 30 is formed with a disc-like mounting or locating flange 32 from which upwardly protrudes a wedge-shaped outlet section 34. A cylindrical inlet portion 36 projects downwardly from the underside of the flange 32.

A passage 38 extends upwardly through the inlet 36 and the wedge shaped outlet 34. A slit 35 is formed in the upper edge of the wedge shaped outlet portion 34 and defines an outlet at the upper end of the passage 38. The slit 35 is normally closed. When the pressure within the passage 38 of the valve 30 exceeds the pressure acting on the exterior of the wedge portion 34, the walls of the wedge portion 34 will flex outwardly to open the slit 35 to permit air to flow upwardly from the passage 38 through the opened slit 35. If, however, the pressure acting on the exterior of the wedge portion 34 exceeds that within the interior of the wedge portion 34, then the slit 35 will be closed to prevent flow of air through the slit 35. The valve 30 thus acts as a one-way check valve which will permit air to flow from the control port 28 to the venturi passage 16 to evacuate the vacuum cup 12, but will block the flow of air from the passage 16 to the control port 28 whenever the pressure at the control port 28 is less than that in the venturi passage 16. Once a vacuum is established within the vacuum cup 12 between the interior ©f the vacuum cup 12 and a workpiece 13, the check valve 30 will lock this vacuum in the vacuum cup 12, even if the flow of air through the venturi passage 16 is stopped and pressure within the venturi passage 16 returns to normal atmospheric pressure.

In order to release the vacuum within the vacuum cup 12, a third passage 44 extends through the housing 14 from a first end 46. A one-way, spring-loaded, ball check valve 48 is located within the third passage 44 and is oriented to seat toward the inlet 46; that is, the valve 48 will accommodate air flow from the inlet 46 into the third passage 44, but will block air flow from the passage 44 to the inlet 46. The third passage 44 communicates with the control port 28 by an inclined passage 50 which is formed in the housing 14 and extends from one end of the third passage 44 to the control port 28.

The housing 14 is formed with a generally T-shaped slot 56. The housing 14 has protruding shoulders which close one end of the T-shaped slot 56 from the passage of a fitting therethrough.

As shown in FIG. 1, a fitting 58 having a generally T-shaped upper flange 60 is mounted on the vacuum cup 12. Normally, and as described in U.S. Pat. No. 4,957,318, the contents of which are incorporated herein by reference, the T-shaped flange 60 of the fitting 58 on the vacuum cup 12 will be slidingly urged into the slot 56 in the housing 14 and be locked therein via a spring-biased ball. A release push button 62 mounted externally on the housing 14 acts on the ball to retract the ball from engagement with the T-shaped flange 60 to enable the T-shaped flange 60 and the entire vacuum cup 12 to be slidingly removed from the housing 14.

In the present invention, an intermediate connector block 62 is provided with a T-shaped upper flange 64. The T-shaped flange 64 on the connector block 62 slidingly engages the slot 56 in the housing 14 and is locked therein via the ball means described above. The connector block 62 includes a lower T-shaped slot 66 which slidingly receives the T-shaped flange 60 on the suction cup 12. Suitable locking and release means as described above may be provided on the connector block 62 to releasably lock the suction cup 12 to the connector block 62.

As shown in FIG. 1, the connector block 62 has a centrally located bore 68 extending therethrough. The bore 68 is disposed in fluid flow communication with the control port 28 on the housing 14 when the connector member 62 is mounted to the housing 14. Similarly, the lower end of the bore 68 is disposed in fluid flow communication with a bore 70 extending through the T-shaped fitting 58 on the suction cup 12 to dispose the hollow interior 72 of the suction cup 12 in fluid flow communication with the control port 28 on the housing 14.

Figure 4:
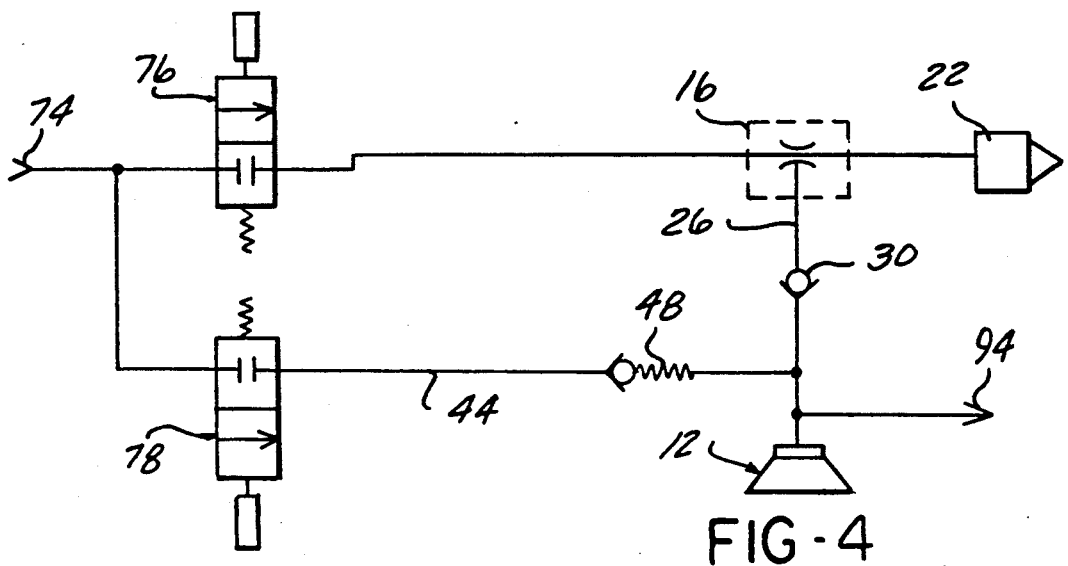
FIG. 4 is a pneumatic diagram of the vacuum cup control apparatus of the present invention.

Referring now to FIG. 4, the housing 14 is connected to a source 74 of pressurized air. In this manner, pressurized air is supplied to the venturi passage 16 and the third passage 44 in the housing 14. Valve means are provided for selectively applying and releasing vacuum from the vacuum cup 12. In a preferred embodiment, the valve means comprises first and second valves 76 and 78 which are respectively connected to the venturi passage 16 and the third passage 44.

Preferably, the first and second valve means 76 and 78 comprise individual solenoid operated, spring-return, poppet valves. Alternately, a single valve may be employed to direct pressurized air through each of the venturi passage 16 and the third passage 44. Such a single valve may be a four-way, double solenoid-operated, blocked center valve. In either case, the valve means is mounted within the housing 14 with suitable connections to an external source 74 of pressurized air.

Figure 5:
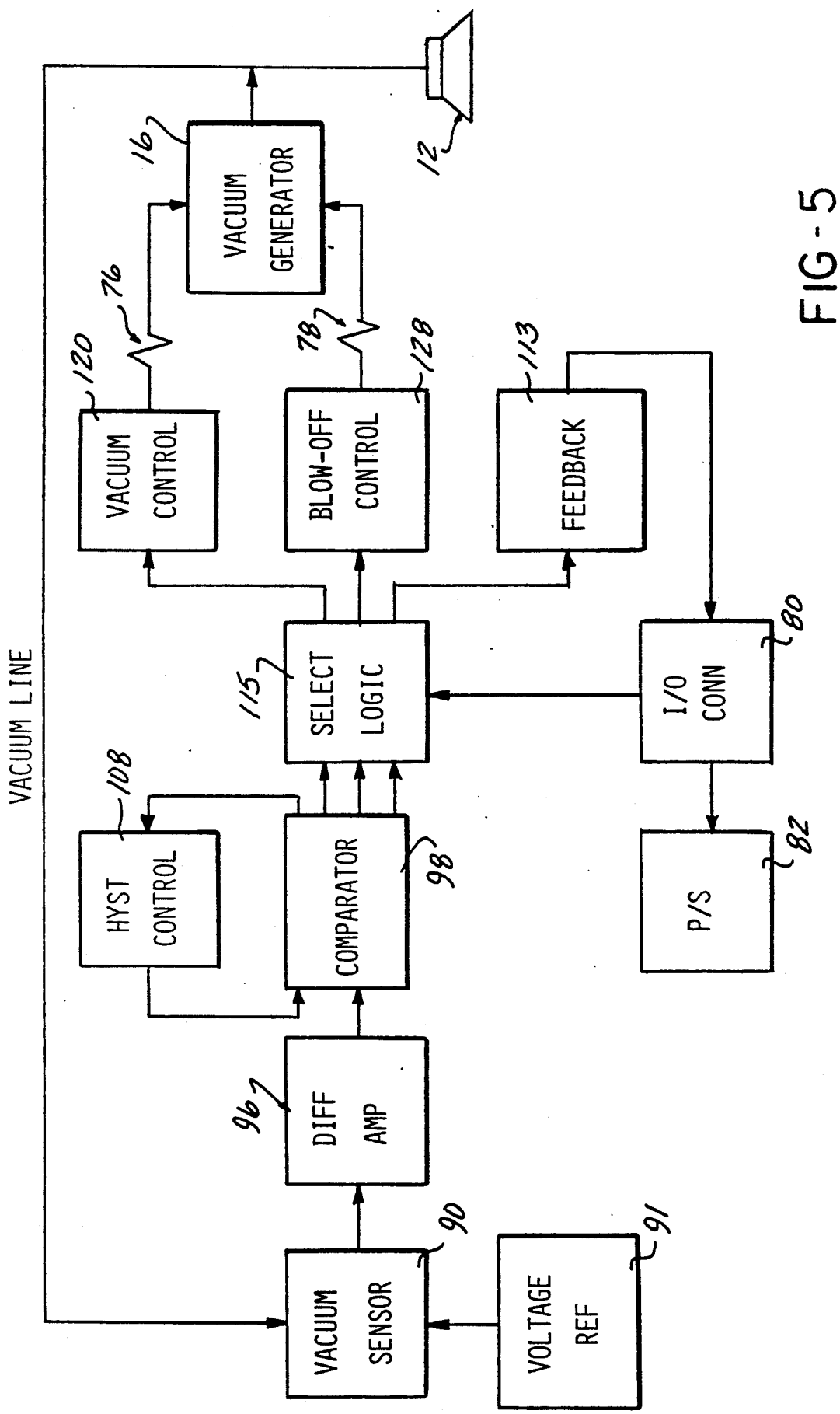
FIG. 5 is an electrical block diagram of the vacuum cup control apparatus of the present invention.
Figure 6:
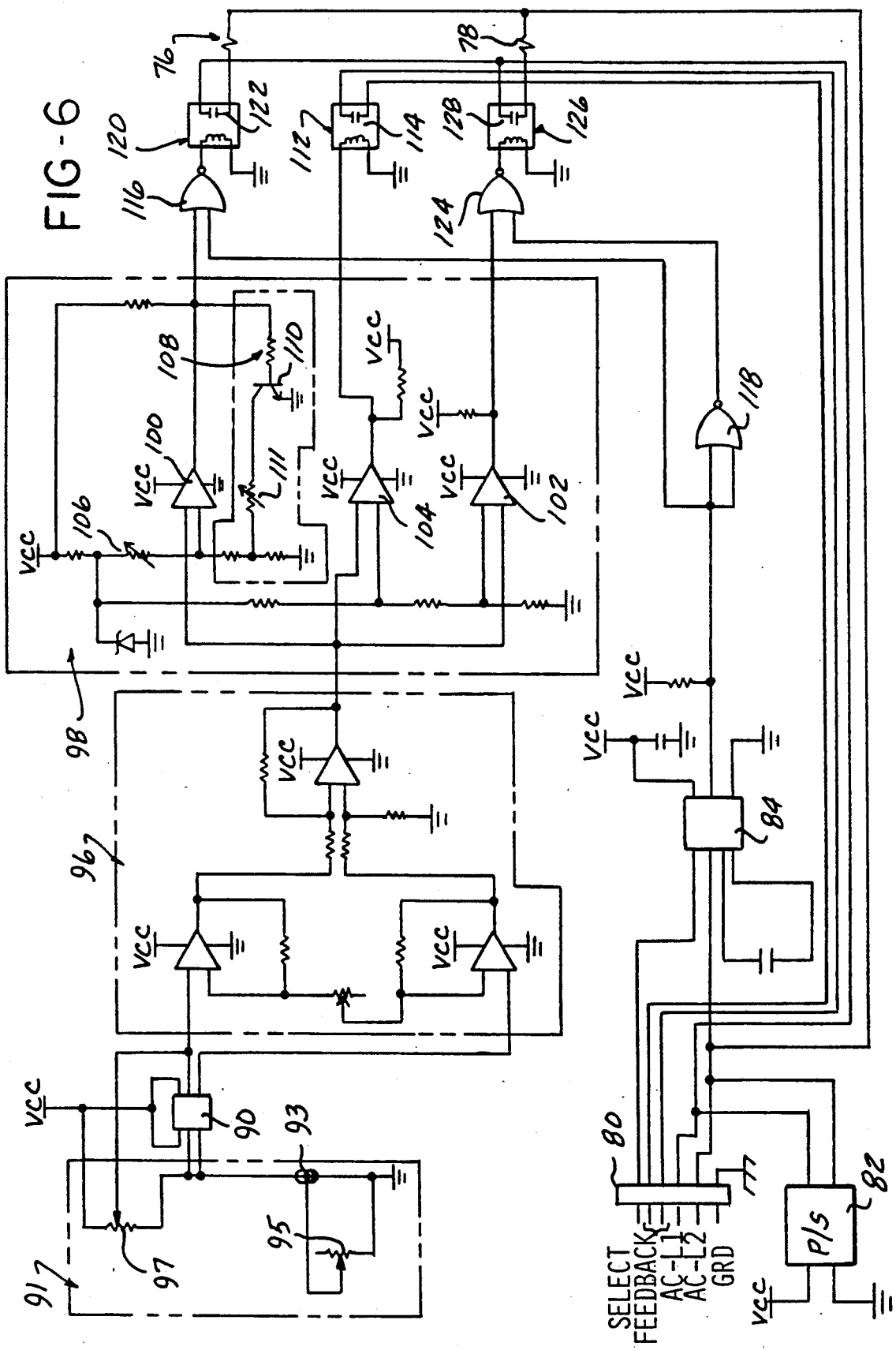
FIG. 6 is a detailed circuit diagram of the vacuum cup control apparatus shown generally in FIG. 5.

The control means of the apparatus 10 of the present invention is shown in detail in FIGS. 5 and 6. The control means includes an input/output connector means 80 which is mounted in the housing 14 and connects control signals between the circuitry employed in the control means in the housing 14 and an external control device or controller, such as a programmable logic controller (PLC). The external controller supplies various input signals labelled "SELECT", "AC-L1", "AC-L2" and ground to the control means. A signal labelled "FEEDBACK" is generated by the control means and supplied to the external controller.

The control means further includes an internal power supply 82 which is connected to the AC-L1 and AC-L2 lines on the input/output connector means 80. The power supply 82 generates the required low level DC voltages required by the electronic components used in the control means. This low level voltage is labelled "VCC" and is connected to the various components of the control means.

The control apparatus mounted in the housing 14 includes a pressure sensor means 90 which detects the pressure or vacuum level at the control port 28 in the housing 14. The sensor means may comprise any conventional type of sensor which provides an electrical output signal indicative of the pressure levels sensed thereby. For example, a pressure sensor 90, Model No. NPS-200-D1 manufactured by Nova Sensor, may be employed in the present invention.

Referring briefly to FIG. 1, an auxiliary flow passage 92 is formed in the connector block 62 and is disposed in fluid flow communication at one end with the central bore 68 in the connector block 62 and the control port 28 in the housing 14 when the connector block 62 is mounted on the housing 14. A separate conduit 94 extends from one end of the passage 92 to the housing 14. The other end of the conduit 94 is connected to the pressure sensor 90 in the housing 14 to enable the vacuum level within the vacuum cup 12 or at the control port 28 disposed in fluid flow communication with the vacuum cup 12 to be measured.

As shown in FIG. 6, the pressure sensor 90 is provided with a voltage reference circuit 91 which includes an excitation source 93, such as a constant current source, which is adjusted by a first potentiometer 95. An offset voltage is supplied by a second potentiometer 97.

The output from the pressure sensor 90 is input to a differential amplifier means 96. The differential amplifier means 96 is formed of three operational amplifiers which amplify the low level signal from the pressure sensor 90 to a more useful level. The output from the differential amplifier means 96 is input to a comparator means 98. In a preferred embodiment, the comparator means 98 comprises a three stage comparator formed of a first comparator 100, a second comparator 102 and a third comparator 104. The first comparator 100 functions to turn the vacuum generator off when the vacuum level within the suction cup 12 reaches a predetermined level set by a reference voltage determined, in part, by potentiometer 106. The voltage reference signal from the potentiometer 106 is input to the first comparator 100 along with the output of the differential amplifier means 96.

A hysteresis control means or circuit 108 is also connected between the output of the first comparator means 100 and the reference voltage input to the first comparator 100. The hysteresis control means 108 includes a transistor 110 which has one leg connected to the output of the first comparator 100. The collector of the transistor 110 is connected through an adjustable potentiometer 111 to the midpoint of a voltage divider which is connected to the reference voltage input of the first comparator 100.

When the first comparator 100 changes from a low to a high state, the transistor 110 will be driven to a conducting state thereby shunting the lower portion of the first voltage divider with the adjustable potentiometer 111 and causing the voltage reference signal at one input of the first comparator 100 to be lowered a predetermined amount set by the values of the voltage divider resistors and the adjustable potentiometer 111. This provides a window or band, the purpose of which will be described hereafter. The transistor 110 will be rendered non-conductive when the output of the first comparator 100 switches to its normal, low state, as will occur when the output signal from the differential amplifier means 96 decreases below that of the initial voltage reference input signal to the first comparator 100.

The second comparator 102 functions to control the supply of pressurized air or "blow-off" to the vacuum cup 12. Input to the second comparator 102 is a second voltage reference signal and the output from the differential amplifier means 96. The second voltage reference signal is lower than the voltage reference signal supplied to the first comparator 100, such as a signal which would correspond to a small amount of vacuum, such as one inch of mercury, in the vacuum cup 12. The output of the second comparator 102 will be a logic low state if the second reference voltage signal is lower than the output of the differential amplifier means 96. If the second voltage reference signal is higher than the output of the differential amplifier 96, the output of the second comparator 102 will be a logic high state.

The third comparator 104 acts as a feedback signal generator. Input to the third comparator is the output from the differential amplifier means 96 and a third reference voltage input signal. The third reference voltage input signal is selected so that the third comparator 104 will generate an output when a predetermined amount of vacuum, such as twelve inches of mercury, is present in the vacuum cup 12, i.e., when the output of the differential amplifier means 96 is greater than the third voltage reference, the output of the third comparator 104 will be in a logic high state.

The output from the third comparator 104 is supplied to a third driver means 112. The third driver means 112 preferably comprises a relay having one set of contacts 114. The contacts 114 are connected to the input/output connector 80 to provide a switch closure to the external controller indicating that a predetermined amount of vacuum has been achieved in the vacuum cup 12. This signal is used by the external controller in its normal control operation. The third comparator 104 and the third driver 112 thus form a feedback signal generator circuit which is denoted by reference number 113 in FIG. 5.

The first and second comparators 100 and 102, respectively, are connected to a select logic circuit 115. The select logic circuit 115 is formed of an opto-coupler 84 and NOR logic gates 116, 118 and 124. The opto-coupler 84 converts the external controller SELECT signal to a suitable logic level for use by the NOR gates 116 and 118. The outputs of the opto-coupler 84 and the NOR gate 118 are used to enable and disable NOR gates 116 and 124, that is, a logic high level on the input of NOR gates 116 or 124 will force the outputs of the NOR gates 116 and 124 to a low logic level disabling the device driven thereby, as described hereafter. The select logic circuit 115 will select only one of two control modes, i.e., vacuum or blow-off. The output of the first comparator 100 is connected to a first NOR gate 116. The other input to the NOR gate 116 is a signal from the opto-coupler 84. The input to the NOR gate 118 is a signal from the opto-coupler 84. This signal selects either vacuum or blow-off as described hereafter.

When vacuum is selected by the external controller, an output signal labelled "SELECT" will be applied to the opto-coupler 4 through the input/output connector means 80. This signal is converted to a logic low level at the output of the opto-coupler 84 to enable NOR gate 116. The output of the opto-coupler 84 is also inverted by NOR gate 118 which applies a high logic level signal to the input of NOR gate 124 to disable NOR gate 124 thus selecting the vacuum mode and disabling the blow-off mode.

The NOR gate 116, when enabled, energizes a first driver 120, such as a relay having an energizable coil controlling one set of switchable contacts 122. Energization of the relay 120 causes the set of contacts 122 to close thereby supplying AC power to the vacuum control valve 76 which, in turn, supplies pressurized air to the venturi passage 16 and generates a vacuum within the vacuum cup 12 as described above. When the predetermined amount of vacuum is achieved in the vacuum cup 12, the first comparator 100 will generate an output which will cause the output of the NOR gate 116 to go low thereby de-energizing the relay 120 and de-energizing the valve 76 ceasing the flow of air through the venturi passage 16. However, as noted above, the check valve 30 in the second passage 26 will block further air flow to the control outlet 28 thereby locking vacuum in the vacuum cup 12 between the interior of the vacuum cup 12 and the engaged workpiece 13.

Similarly, the output of the second comparator 102 is connected to the NOR gate 124 which has as another input the output of the NOR gate 118. The NOR gate 124 is connected to a second driver 126, such as a relay having an energizable coil controlling one set of switchable contacts 128. The set of contacts 128 is connected to the blow-off control valve 78 which supplies pressurized air to the vacuum cup 12 to positively disengage the workpiece 13 from the vacuum cup 12 and relieve the vacuum within the vacuum cup 12.

If blow-off is selected by the external controller, a SELECT signal of opposite logic level from the vacuum SELECT signal will be applied to the opto-coupler 84 via the input/output connector means 80. The output of the opto-coupler 84 changes states to a high logic level, thus disabling NOR gate 116. The output of the opto-coupler 84 will be inverted by NOR gate 118 to enable NOR gate 124 thus selecting or enabling the blow-off mode.

The relays 112, 120 and 126 may be any suitable relays, such as solid state, electromechanical, etc., as well as other switchable elements, such as transistors. Further, the relays 112, 120 and 126 may be provided at any desired voltage, such as 110 VAC or 24 VDC, as desired for the requirements of a particular application.

In operation, it will be assumed that the vacuum cup control apparatus 10 is in a normal, rest position with no vacuum present in the vacuum cup 12. When it is desired to generate a vacuum in the vacuum cup 12, such as when the vacuum cup 12 is located in close proximity to a workpiece 13, the external controller will generate a vacuum SELECT signal which is supplied to the control apparatus 10 via the input/output connector 80. This signal is input to NOR gate 116 and enables NOR gate 116 causing the relay 120 to be activated and closing its associated contacts 122. This energizes the valve 76 which supplies pressurized air through the venturi passage 16. This flow of air through the venturi passage 16 generates a vacuum at the control port 28 and the vacuum cup 12 connected thereto. Vacuum will be continued to be applied to the vacuum cup 12 until a predetermined vacuum level is reached. The vacuum level at the control port 28 is sensed by the vacuum sensor 90 which outputs a signal through the differential amplifier 96 to the first comparator 100 When this signal is slightly greater than the first voltage reference signal supplied as an input to the first comparator 100, the first comparator 100 will generate an output which will cause the NOR gate 116 to switch states and deactivate the relay 120. This opens the contact 122 of the relay 120 and deactivates the valve 76 ceasing the further flow of air through the venturi passage 16 and the further application of vacuum to the vacuum cup 12.

At any vacuum to time after is initially applied the vacuum cup 12 and shut off and prior to the initiation of any blow-off, if, for any event, the vacuum in the vacuum cup 12 decreases below the predetermined level, as sensed by the sensor 90, the sensor 90 will output an appropriate signal which, through the differential amplifier means 96, will be input to the first comparator 100. When this voltage signal decreases below that set as the window or band by the first voltage reference and the hysteresis control 108, the comparator 100 will generate an output which will energize the first relay driver 120 and, thereby, the relay 120 and the vacuum control valve 76 to reapply vacuum to the vacuum cup 12 until the vacuum level within the vacuum cup 12 reaches the predetermined level. When the vacuum in the vacuum cup 12 reaches the predetermined level, the first comparator 100 will change states thereby resetting the hysteresis control 108. This cycle may be repeated indefinitely to overcome any leaks which may be present so as to maintain the vacuum in the vacuum cup 12 between the vacuum cup 12 and the workpiece 13 at a predetermined level.

When it is desired to separate the vacuum cup 12 from the workpiece 13, the external controller will generate a blow-off SELECT signal, i.e., a signal of opposite level from the vacuum SELECT signal, which will cause the output of the NOR gate 118 to switch states. This enables the NOR gate 124 connected to the output of the second comparator 102. NOR gate 124 will generate an output causing the second driver relay 126 to be energized and in turn the closure of its contact 128 whenever a vacuum of a predetermined level is present. This supplies power to the blow-off control valve 78 which supplies pressurized air through the third passage 44 to the vacuum cup 12 relieving the vacuum therein and separating the workpiece 13 from the vacuum cup 12.

In the event that vacuum is again generated or is still present as the vacuum cup 12 separates from the workpiece 13, the second comparator 102 will sense such vacuum via the vacuum sensor 90 and generate an output signal which will re-energize the relay 126 and reapply power to the blow-off valve 78 to supply another stream of pressurized air to the vacuum cup 12 to insure positive separation between the vacuum cup 12 and the workpiece 13.

The vacuum cup control apparatus 10 described above and illustrated in the drawing controls a single cup. The apparatus 10 is mounted in a housing to which the vacuum cup is attached. Also within the scope of the present invention is a single centralized control apparatus which controls a plurality of individual, remotely located, vacuum cups. This centralized control apparatus embodiment may be provided in two configurations.

In a first configuration, identical, individual controls for each of a plurality of vacuum cups are located in one centralized location, remote from the vacuum cups. Separate air lines 74 and vacuum sense lines 94 extend from each control means in the centralized location to each vacuum cup. Each individual control means in the centralized location controls one vacuum cup independent from the other vacuum cups in applying and releasing vacuum to the vacuum cup and sensing the vacuum level within the vacuum cup.

In a second configuration, one centralized control means is connected to a plurality of vacuum cups via individual air lines 74 and vacuum sense lines 94 extending between the centralized control means and each vacuum cup. In this configuration, the control means simultaneously controls each of the vacuum cups. The vacuum sensors for each vacuum cup are connected in series such that a leak detected in any vacuum cup will cause the control means to reapply vacuum to all of the vacuum cups. Otherwise, the operation of the centralized control apparatus is identical to that described above and illustrated in the drawing.

In summary, there has been disclosed a unique vacuum cup control apparatus which overcomes many of the problems encountered with previously devised vacuum cup control apparatus. The apparatus of the present invention monitors vacuum pressure within the vacuum cup and controls the reapplication of vacuum to the vacuum cup so as to maintain the vacuum level at a predetermined level. If any leaks exist which would cause the vacuum in the vacuum cup to decrease below the predetermined level, the control apparatus automatically reapplies vacuum to the vacuum cup.

The control apparatus of the present invention also includes a blow-off control which injects a stream of pressurized air to the vacuum cup to relieve vacuum therein and to separate the workpiece from the vacuum cup. In the event that vacuum is still present for any reason as the vacuum cup separates from the workpiece, the blow-off control will be automatically re-energized to supply another stream of pressurized air to insure positive separation of the vacuum cup from the workpiece.

The vacuum cup control apparatus of the present invention may be applied to each vacuum cup in a particular manufacturing operation. Alternately, a single control may be connected through individual vacuum and pressurized air flow conduits to separate vacuum cups.

What is claimed is:

1. A vacuum cup control apparatus for applying and releasing vacuum to a vacuum cup engaging a workpiece, the vacuum cup control apparatus comprising:
   a housing;
   a first flow passage extending through the housing between a first inlet connected to a source of air under pressure and an outlet vented to atmosphere;
   venturi means including a throat section disposed in the first passage for producing a subatmospheric pressure in the throat section on the flow of air through the first passage;
   a control port in the housing opening at one end in fluid flow communication with the vacuum cup;
   a second flow passage formed in the housing and extending from the first flow passage to the control port;
   a one-way valve disposed in the second passage and allowing flow in one direction from the control port through the second passage to the first passage;
   a third flow passage in the housing connected to a source of air under pressure and to the control port for supplying air under pressure to the vacuum cup to release vacuum in the vacuum cup;
   sensor means, mounted in the housing and disposed in fluid flow communication with the control port, for sensing the vacuum pressure at the control port in the housing;
   connector means for receiving electrical signals specifying the application and release of vacuum in the vacuum cup; and
   control means, mounted in the housing and responsive to the sensor means and the connector means, for controlling the selective application of vacuum to the vacuum cup, the application of pressure air to the vacuum cup and the reapplication of vacuum to the vacuum cup in the event of a decrease in vacuum in the vacuum cup below a predetermined level after vacuum is applied to the vacuum cup and prior to the application of pressurized air to the vacuum cup, the control means including:
   valve means for controlling the flow of air to the first and third passages in the housing;
   first comparator means, responsive to the sensor means and a first reference signal specifying a predetermined vacuum level connected to a reference signal input of the first comparator means, for comparing the output of the sensor means with the first reference signal;
   the first comparator means generating an output signal when the vacuum level sensed by the sensor means reaches a predetermined level established by the first reference signal;
   first driver means for energizing the valve means to apply vacuum to the vacuum cup;
   first logic means, responsive to the first comparator means and the connector means, for activating the first driver means to apply vacuum to the vacuum cup and to de-activate the first driver means when a predetermined vacuum is present in the vacuum cup; and
   hysteresis control means, connected between the output and the reference signal input of the first comparator means, for lowering the first reference signal input to the first comparator means to a predetermined level less than the first reference signal after an output signal is generated by the first comparator means until the vacuum level sensed by the sensor means falls blow the predetermined level set by the hysteresis control means.

2. The vacuum cup control apparatus of claim 1 wherein the control means further comprises:
   second comparator means, responsive to a second reference signal and the output of the sensor means, for generating an output when the output from the sensor means exceeds the second reference signal;
   second driver means for energizing the value means to apply air under pressure to the vacuum cup; and
   second logic means, responsive to the second comparator means and the connector means, for activating the valve means to apply air under pressure to the vacuum cup to release vacuum therefrom.

3. The vacuum cup control apparatus of claim 2 wherein:
   the second comparator means, in response to the sensor means, regenerates an output when the output of the sensor means exceeds the second reference signal at any time after the second logic means has initially activated the value means to apply air under pressure to the vacuum cup, the second logic means reactivating the valve means to reapply air under pressure to the vacuum cup to release the vacuum therefrom.

4. The vacuum cup control apparatus of claim 1 wherein the control means comprises:
   another comparator means, responsive to a reference signal and the output of the sensor means, for generating an electrical signal indicative of a predetermined vacuum level in the vacuum cup; and
   another driver means, connected to the another comparator means and the connector means, for supplying the electrical signal from the another comparator means to the connector means.

5. The vacuum cup control apparatus of claim 1 wherein the valve means comprises:
   a first valve connected between the source of air under pressure and the first inlet in the housing for supplying, when energized, air under pressure to the first flow passage; and
   a second valve connected between the source of air under pressure and the third flow passage in the housing for supplying, when energized, air under pressure to the third flow passage.

6. A vacuum cup control apparatus for applying and releasing vacuum to a vacuum cup engaging a workpiece, the vacuum cup control apparatus comprising:
a housing;
a first flow passage extending through the housing between a first inlet connected to a source of air under pressure and an outlet vented to atmosphere;
venturi means including a throat section disposed in the first passage for producing a subatmospheric pressure in the throat section on the flow of air through the first passage;
a control port in the housing opening at one end in fluid flow communication with the vacuum cup;
a second flow passage formed in the housing and extending from the first flow passage to the control port;
a one-way valve means disposed in the second passage allowing flow in one direction from the control port through the second passage to the first passage;
a third flow passage in the housing connected to a source of air under pressure and to the control port for supplying air under pressure to the vacuum cup to release vacuum in the vacuum cup;
sensor means, mounted in the housing and disposed in fluid flow communication with the control port, for sensing the vacuum pressure at the control port in the housing;
connector means for receiving electrical signals specifying the application and release of vacuum in the vacuum cup;
valve means for controlling the flow of air to the first and third passages in the housing;
first comparator means, responsive to the sensor means and first reference signal specifying a predetermined vacuum level connected to a reference signal input of the first comparator means, for comparing the output of the sensor means with the first reference signal;
the first comparator means generating an output signal when the vacuum level sensed by the sensor means reaches a predetermined level established by the first reference signal;
first driver means for energizing the valve means to apply vacuum to the vacuum cup;
first logic means, responsive to the first comparator means and the connector means, for activating the first driver means to apply vacuum to the vacuum cup and to de-activate the first driver means when a predetermined vacuum is present in the vacuum cup;
second comparator means, responsive to a second reference signal and the output of the sensor means, for generating an output when the output from the sensor means exceeds the second reference signal;
second driver means for energizing the valve means to apply air under pressure to the vacuum cup;
second logic means, responsive to the second comparator means and the connector means, for activating the valve means to apply air under pressure to the vacuum cup to release vacuum therefrom;
third comparator means, responsive to a reference signal and the output of the sensor means, for generating an electrical signal indicative of a predetermined vacuum level in the vacuum cup; and
third driver means, connected to the third comparator means and the connector means, for supplying the electrical signal from the third comparator means to the connector means.

7. The vacuum cup control apparatus of claim 6 wherein:
the first, second and third driver means comprise a relay having an energizable coil controlling a first switchable element.

8. The vacuum cup control apparatus of claim 6 further including:
hysteresis control means, connected between the output and the reference signal input of the first comparator means, for lowering the first reference signal input to the first comparator means to a predetermined level less than the first reference signal after an output signal is generated by the first comparator means until the vacuum level sensed by the sensor means falls below the predetermined level set by the hysteresis control means.

* * * * *